US010599960B2

(12) United States Patent
Hennessy (10) Patent No.: US 10,599,960 B2
(45) Date of Patent: Mar. 24, 2020

(54) LASER CUTTING OF PRINTED LABELS

(71) Applicant: ELECTRONICS FOR IMAGING, INC., Fremont, CA (US)

(72) Inventor: John Edward Hennessy, Grosse Pointe Park, MI (US)

(73) Assignee: ELECTRONICS FOR IMAGING, INC., Fremont, CA (US)

( * ) Notice: Subject to any disclaimer, the term of this patent is extended or adjusted under 35 U.S.C. 154(b) by 0 days.

(21) Appl. No.: 15/455,038

(22) Filed: Mar. 9, 2017

(65) Prior Publication Data

US 2017/0182807 A1  Jun. 29, 2017

Related U.S. Application Data

(62) Division of application No. 14/630,587, filed on Feb. 24, 2015, now abandoned.

(51) Int. Cl.

| | |
|---|---|
| *B41J 11/70* | (2006.01) |
| *G06K 15/02* | (2006.01) |
| *G06K 15/00* | (2006.01) |
| *B23K 26/402* | (2014.01) |
| *B23K 26/364* | (2014.01) |
| *B31D 1/02* | (2006.01) |

(Continued)

(52) U.S. Cl.
CPC .......... *G06K 15/024* (2013.01); *B23K 26/364* (2015.10); *B23K 26/402* (2013.01); *B31D 1/026* (2013.01); *B41J 2/175* (2013.01); *B41J 2/1714* (2013.01); *B41J 3/4075* (2013.01); *B41J 11/663* (2013.01); *B41J 11/70* (2013.01); *G06K 15/403* (2013.01); *B23K 2103/172* (2018.08); *B23K 2103/42* (2018.08); *B23K 2103/50* (2018.08); *G06K 15/102* (2013.01)

(58) Field of Classification Search
CPC .......... H04N 1/00567; H04N 1/00676; G06K 15/024; B41J 3/4075; B41J 11/666
See application file for complete search history.

(56) References Cited

U.S. PATENT DOCUMENTS

| | | |
|---|---|---|
| 6,592,693 B1 | 7/2003 | Nedblake |
| 7,250,191 B2 | 7/2007 | Scheubner |

(Continued)

FOREIGN PATENT DOCUMENTS

| | | |
|---|---|---|
| EP | 1905600 A2 | 4/2008 |
| EP | 2692518 A1 | 2/2014 |

*Primary Examiner* — Frantz Bataille
(74) *Attorney, Agent, or Firm* — Perkins Coie LLP (57) ABSTRACT

Apparatuses and embodiments related to compensated laser cutting of labels. A computer system receives an image of a label, and rasterizes the image. The computer system determines how much of each type of printer ink of a label printer to deposit at each pixel location of the image. The computer system determines which pixels intersect a cut line, and determines the characteristics of the ink of the pixels, such as the quantity or thickness of the ink at the pixel locations. The computer system determines laser data including power, cut speed, and/or frequency of a laser that is tuned to accurately cut through the ink that forms the image, the material(s) of the label, and the adhesive that removably adheres the label to base material(s), but to not excessively damage the base material(s). A laser cutting system uses the laser data to control a laser.

13 Claims, 7 Drawing Sheets

(51) Int. Cl.
*B41J 11/66* (2006.01)
*B41J 2/175* (2006.01)
*B41J 2/17* (2006.01)
*B41J 3/407* (2006.01)
G06K 15/10 (2006.01)
B23K 103/00 (2006.01)
B23K 103/16 (2006.01)

(56) References Cited

U.S. PATENT DOCUMENTS

| | | |
|---|---|---|
| 7,306,388 B2 | 12/2007 | Acher et al. |
| 7,802,388 B2 | 9/2010 | Henkel et al. |
| 8,008,597 B2 | 8/2011 | Watanabe |
| 2003/0059280 A1 | 3/2003 | Stevens et al. |
| 2007/0256780 A1 | 11/2007 | Gilmour et al. |
| 2008/0311299 A1* | 12/2008 | Furukawa .................. B41J 3/44 427/261 |
| 2010/0026738 A1* | 2/2010 | Saikawa ................ B41J 3/4075 347/1 |
| 2011/0036504 A1 | 2/2011 | Phillips et al. |
| 2011/0070390 A1* | 3/2011 | Costin, Sr. ......... B23K 26/0846 428/43 |
| 2012/0216951 A1 | 8/2012 | Kian et al. |
| 2014/0259834 A1 | 9/2014 | Galoff et al. |
| 2014/0335286 A1 | 11/2014 | Izawa et al. |

* cited by examiner

LASER CUTTING OF PRINTED LABELS

CROSS REFERENCE TO RELATED APPLICATIONS

This application is a divisional of U.S. patent application Ser. No. 14/630,587, filed Feb. 24, 2015, which application is incorporated herein in its entirety by this reference thereto.

TECHNICAL FIELD

The invention relates to the field of printing systems, structures, and associated processes. More particularly, the invention relates to laser cutting of labels.

BACKGROUND

Manufacturers today can label goods, such as food products, car parts, etc., with adhesive labels. In one example, the labels are applied to the goods on a manufacturing line by a labeling machine, which uses large rolls of labels. The label rolls of this example are made of pressure sensitive label stock that is constructed of three layers, a top layer, an adhesive layer, and a base layer. The top layer, upon which the label is printed, is referred to as face stock. The face stock is removably adhered to the base layer, which is referred to as the liner, using the adhesive. Because the face stock is removably adhered to the liner, the face stock and the underlying adhesive can be peeled off of the liner and applied to the good.

Before being shipped to the manufacturer, the large rolls of labels of this example are prepared for use by a label provider. The label provider applies the label image to the face stock, such as by digitally printing the label on the face stock. The label stock is then cut so that the labels can be peeled off of the liner. Using a cutting process that cuts through the face stock and the adhesive, but not the liner, such as a kiss cut process, the label stock is cut so that a label of the desired shape can be peeled off of the liner. The portion of the face stock that does not include the label image, referred to as the matrix, is then peeled off so that only the labels are adhered to the liner. The liner stock, with the labels now ready to be removed from the liner and applied to the manufacturer's goods, is then rolled into large rolls and delivered to the manufacturer.

SUMMARY

This application discloses a technique and related technology for using a laser to cut labels. Some face stock, such as biaxially oriented polypropylene (BOPP), can be difficult to cut with a laser due to being very sensitive to the power of the laser. A little too much power from the laser, which can result from too high of a power setting for the laser or too slow of a cut speed, and the laser can burn though the BOPP and the adhesive and into the liner. Burning into the liner damages the structural integrity of the liner and can cause the liner to tear or stretch unacceptably when being used by the labeling machine. When a laser is cutting through clean BOPP, or through BOPP with a uniform coating of ink, the laser power and cutting speed can be finely tuned, such that the laser cuts through the face stock and the adhesive, but not through the liner.

When a label image is printed on the face stock and the cut line goes through the image, the non-uniform thickness and coverage of the ink used to print the image can cause the finely tuned laser power and cut speed to no longer cut properly. For example, when the ink is thick, the laser may not cut through the face stock and the adhesive. When the ink is thin, the laser may cut through the face stock and the adhesive, and into the liner. Tuning the laser power and the cut speed to account for the ink is problematic, because the ink is not uniform along the cut line. For example, the image may not be printed at all points on the cut line. Those points on the cut line without an image will not have any ink. Further, the thickness and composition of the ink can vary along the cut line.

In one example, a printer is a four color process printer that prints images using a cyan ink, a magenta ink, a yellow ink, and a black ink. The printer can create a rainbow of colors by combining different amounts of each of these inks. A first point on the cut line is a first color, and the printer applies 42 picoliters (pl) of cyan ink, 36 pl of magenta ink, 12 pl of yellow ink, and 6 pl of black ink to create the first color. A second point on the cut line is a second color, and the printer applies 42 pl of cyan ink to create the second color. As is apparent, the amount of ink at the first point is more than at the second point. Resultantly, a laser power and cut speed that is tuned to cut through the ink, face stock, and adhesive at the first point may cut into the liner layer at the second point.

The disclosed technology enables the laser power and the cut speed to be compensated based on characteristics related to the label image, such as the thickness of the ink along the cut line, the reflectivity of the ink along the cut line, etc. In an illustrative use case, a label provider uses a label printing and cutting system (a "Ipc system") to design a label. The label provider uses the Ipc system to create the label image and to capture the shape of the label, the shape being captured in the form of a cut line. The Ipc system of the illustrative use case is a digital printing system that breaks the image into individual pixels, and processes the image to determine the color of each pixel. The Ipc system, knowing the size, location, and color of each pixel, determines, such as via a rasterization process, also referred to as a ripping process, how much of each color ink to apply at each pixel location to print the pixel. The Ipc system, similarly knowing the location of the cut line, determines all of the pixels of the image through which the cut line passes.

Based on various factors, such as the quantity of each color of ink that is applied to each pixel of the cut line, the reflectivity of the ink that is applied to each pixel of the cut line, etc., the Ipc system in this illustrative use case determines a laser power and cut speed for a location on the cut line that corresponds to where the pixel is to be printed. The Ipc system, along with creating raster data that identifies how much of each printer ink to print at each pixel, also creates cut line data that identifies the laser power and cut speed at each location on the cut line. At cut line locations where more ink is applied during the label printing process, or where the applied ink has a higher reflectivity, the Ipc system can increase the laser power and/or reduce the laser cut speed to tune the laser cutter to cut through the ink, the face stock, and the adhesive, but not cut through the liner. At cut line locations where less or no ink is applied during the label printing process, or where the applied ink has a lower reflectivity, the Ipc system can reduce the laser power and/or increase the laser cut speed to tune the laser cutter to cut through the ink (when there is ink), the face stock, and the adhesive, but not cut through the liner.

The disclosed technology can be applied to any digital or analog printing technology where the print image or any feature related to the image is described by data in a digital file, such as a flexo, gravure, digital offset press using laser cutting technology immediately inline or in a downstream, re-registering process. The disclosed technology can further be utilized for any face stock or liner material, and can be utilized for any imaging or coating technology that applies different thicknesses of inks/coatings/etc. in specific or known patterns, cuts, marks, etc., where the applied inks/coatings/etc. will be cut by a laser. Some of the processes illustrated in the figures can be done offline, or in separate process steps. For example, the machinery can re-register to the printed or coated features of the image in order to accomplish the process offline or in separate process steps.

BRIEF DESCRIPTION OF THE DRAWINGS

Embodiments of the present invention will be described and explained through the use of the accompanying drawings in which.

DETAILED DESCRIPTION

Figure 1:
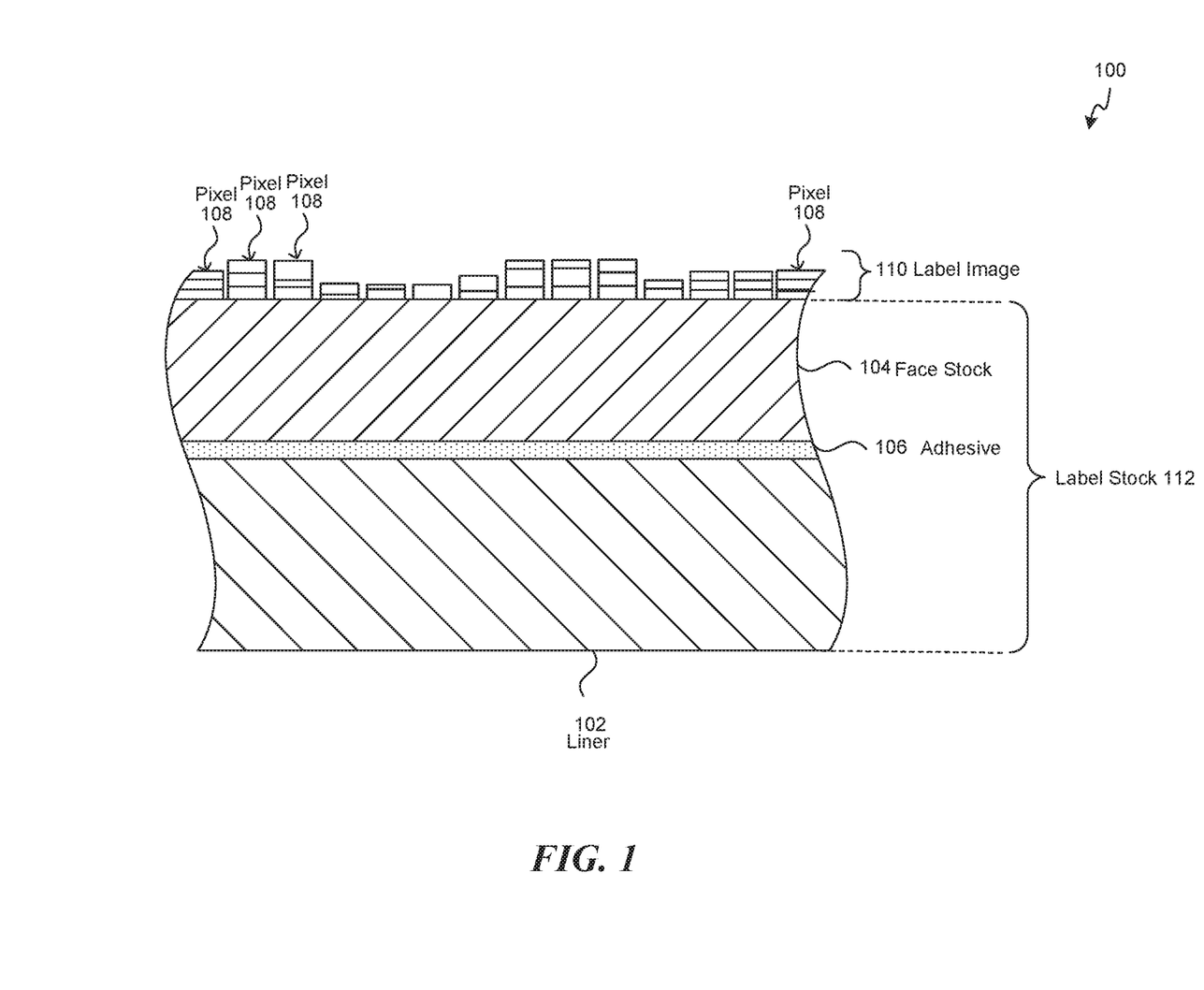
FIG. 1 is an illustration of a cross-section of label stock that includes a printed image, consistent with various embodiments.

FIG. 1 is an illustration of a cross-section of label stock that includes a printed image, consistent with various embodiments. Cross-section 100 shows a cross-section of label stock 112, which includes liner 102, adhesive 106, and face stock 104. Face stock 104 has been removably applied to liner 102 by using adhesive 106 to adhere face stock 104 to liner 102. Label image 110, made from multiple colors of ink applied to face stock 104 at pixels 108 by a label printer, has been printed on a surface of face stock 104.

In the example of FIG. 1, label image 110 was printed with a digital printer, such as an ink jet printer. An image to be printed with a digital printer is a map of dots, each dot being referred to as a pixel, with x and y coordinates for each dot. The digital representation of the pixels can be generated during a process referred to as rasterization, and can be stored in a file, referred to as a raster file. Pixels 108 represents a several of the pixels from the pixel file after being printed, where they become dots of ink that, together, create label image 110. If all of the dots are in the correct position on face stock 104, and the correct amount of each color of ink is accurately applied at each dot location by the ink jet printer, the expected quality is achieved.

A computer system can create the raster file for the label printer. For example, in a process referred to as rasterization or ripping, the computer system reads in an image file containing an image of the label. When not already broken into pixels, the computer system can digitally break the electronic image into individual pixels. The computer system can analyze the color and size of each pixel, determine a quantity of each of the colored inks of the label printer that are needed to print the pixel, and write the determined information to the raster file.

The label printer of this example, which is an ink jet printer and has an inkjet for each color of ink, can read the raster file created by the computer system, and can control each of the inkjets to fire out drops containing a controlled amount of the particular color of ink of that inkjet onto the surface of face stock 104. A drop of ink fired by an inkjet lands on the media, in this example face stock 104, and forms, along with the other colors of ink that are fired out for this pixel by the other ink jets of the printer, a dot that represents one of the pixels.

In some embodiments, there is one inkjet per color of ink and the printer moves the inkjets back and forth across the print media where the inkjets print a line of pixels. In other embodiments, there is more than one inkjet per color. Once a row of pixels is printed, the print media advances to the next row of pixels, and the inkjet once again moves back and forth across the print media printing the next row. When this advancement is correct, the y coordinate of each dot is in place. This is the step adjustment. As the inkjet moves across the print media, the inkjet passes individual pixels. When the inkjet is located at a pixel that is determined should have a drop of ink of that color, the inkjet fires a drop of ink.

In some embodiments, there are multiple inkjets for each color of ink and the inkjets are arranged in an array that enables each pixel to be printed without any inkjet needing to move. The print media is moved continuously past the array of inkjets. As the print media moves past the inkjets, each pixel passes under an inkjet. When the print media is moved such that a particular pixel is under an inkjet, and if it is determined that the particular pixel should have a drop of ink of the color of the inkjet, the inkjet fires a drop of ink. The print media continues moving until the desired image is printed.

When an inkjet nozzle is disabled, i.e. it does not fire ink, a blank space is left in the map of dots that form the image. An ink jet printer's quality is achieved by positioning the drops of ink precisely to form each dot, and by accurately controlling the amount of each drop of ink. The higher the printed resolution, the smaller the dots are or can be made.

Figure 2:
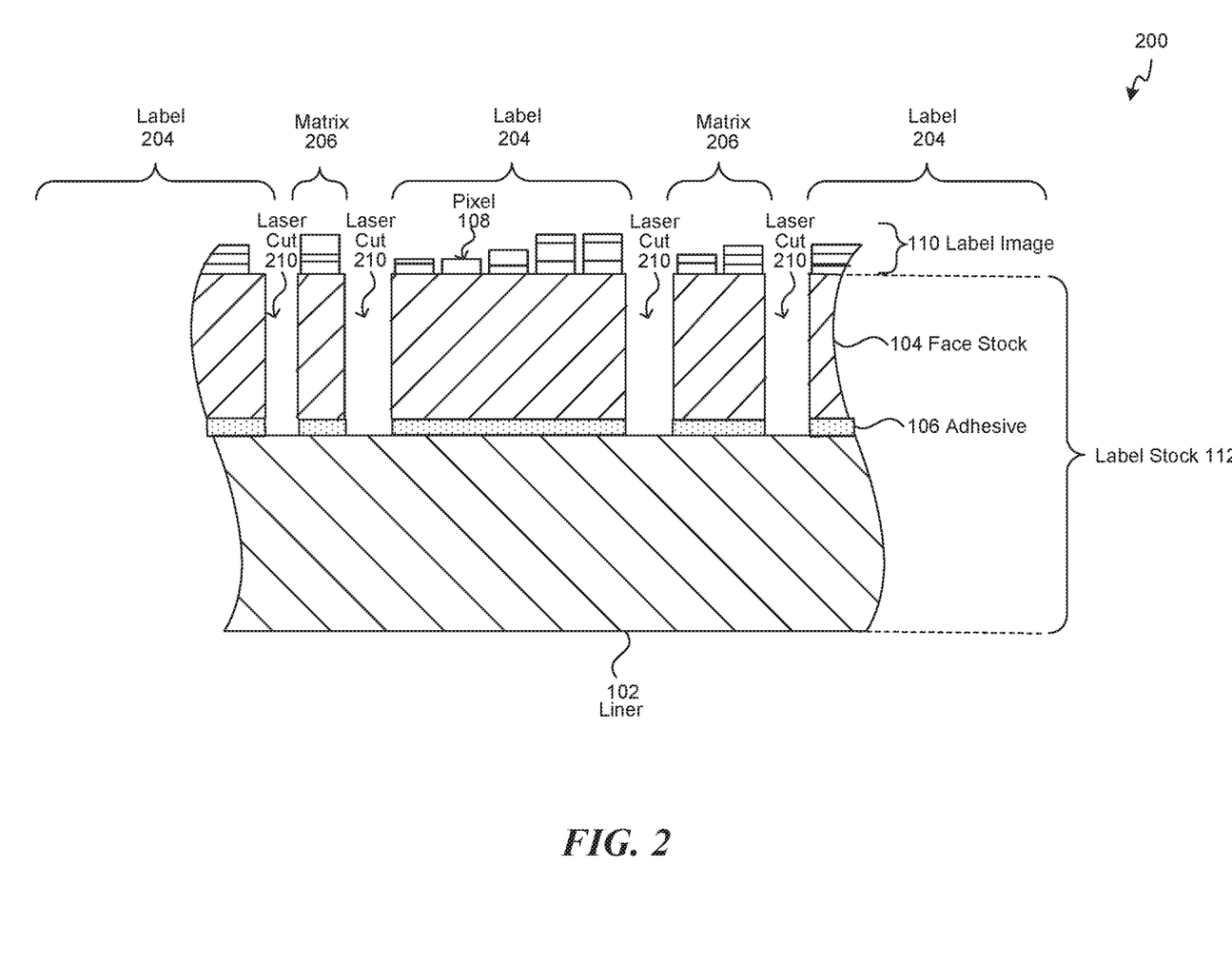
FIG. 2 is an illustration of a cross-section of label stock after laser cutting, consistent with various embodiments.

FIG. 2 is an illustration of a cross-section of label stock after laser cutting, consistent with various embodiments. Cross-section 200 shows a cross-section of laser stock 112 after a laser has been used to create laser cut 210, which is a cut through label image 110, face stock 104, and adhesive 106. A computer system, such as laser cutting system, can create a cut line file, which is a file that contains instructions and/or data that can control a laser cutter and cause the laser cutter to emit a laser to burn a cut, such as laser cut 210, along a cut line, such as cut line 702 of FIG. 7. The instructions/data can control the location of the cut line, the power of the laser as it passes along the cut line, and/or the speed that the laser passes along the cut line. In some embodiments, the cut line file and the raster file are one file that includes both sets of data/instructions.

Figure 7:
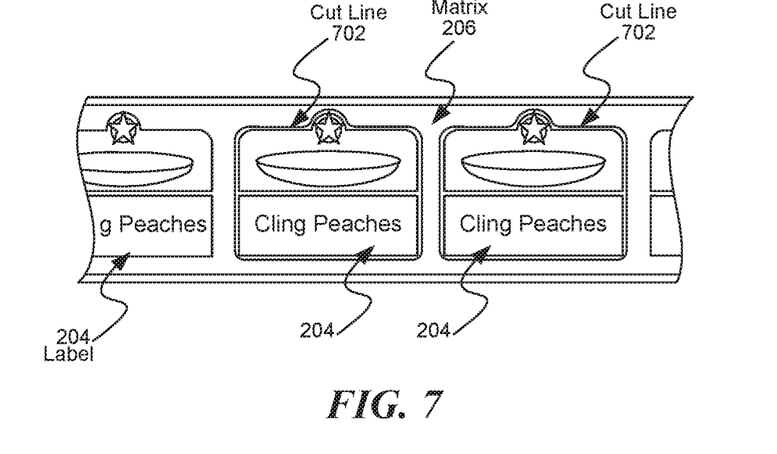
FIG. 7 is an illustration of label stock after an image is printed on the label stock and a cut line is cut into the label stock, consistent with various embodiments.

A cut line is a line that defines a path to be followed by a laser while cutting face stock of label stock that has labels printed on it. FIG. 7 shows cut line 702, which has been cut by a laser to create a laser cut similar to laser cut 210. The cut line defines the shape of the label, which can be any of various shapes. For example, the label can be cut in the shape of a star shape, a rectangle, a circle, an outline of a person or car, etc. After a sheet of label stock has been cut, the sheet can contain many cut labels, such as the multiple label 204's. Matrix 206 is the portion of face stock material 104 that is not part of any of the label 204's, as can be seen on FIG. 7. Matrix 206 can be removed from label stock 112, so that all of the remaining face stock 104 is part of a label 204, and so that label 204 can be easily peeled off of liner 102. After the laser cutting, and in some cases after the removal of matrix 206, label stock 112 can be rolled into a label stock roll that is ready for use by a labeling machine, or can be peeled by hand and applied.

Figure 3:
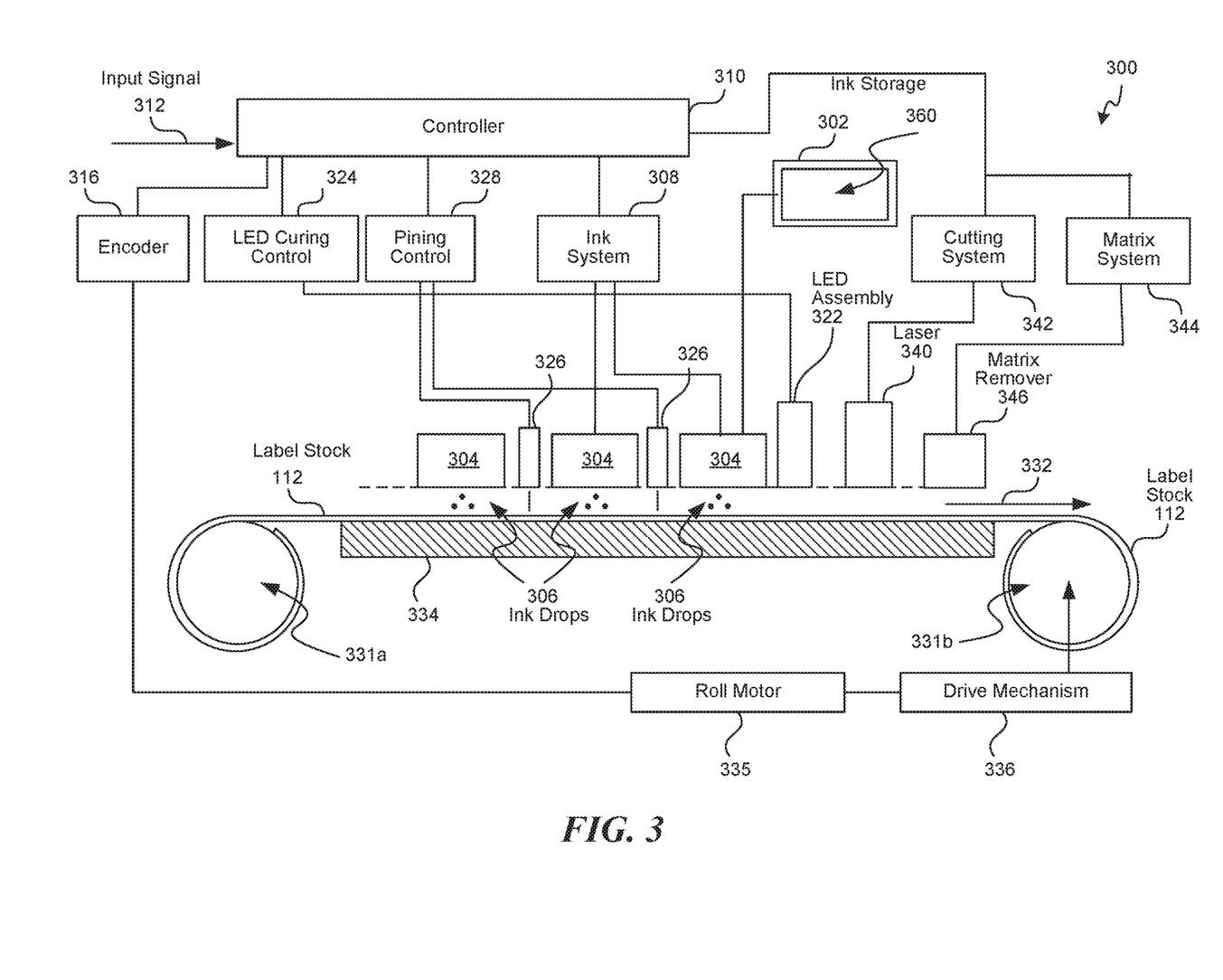
FIG. 3 is a schematic of a print/cut system that prints and cuts a roll of labels, consistent with various embodiments.

FIG. 3 is a schematic of a print/cut system that prints and cuts a roll of labels, consistent with various embodiments. Print/cut system 300 of the embodiment of FIG. 3 is a single pass roll to roll label printer that moves label stock 112, supported by a platen 334, from print roll holder 331a to print roll holder 331b, where label stock 112 passes under one or more print heads 304, lamps 322, and lasers 340. Print/cut system 300 also includes controller 310, ink storage 302 that contains ink 360, encoder 316, light emitting diode (LED) curing control 324, pinning control 328, ink system 308, cutting system 342, pinning stations 126, matrix system 344, matrix remover 346, roll motor 335, and drive mechanism 336.

Controller 310, which includes a processor, memory, etc., can control various components of print/cut system 310. Input 312 can be, for example, a file that includes both raster data, which is used to control the ink that is emitted from print heads 304, and cut line data, which is used to control the power and speed at which the laser beam of laser 340 moves across label stock 112 when cutting the label stock. Print heads 304 can be ink jets. Controller 310 can send instructions for controlling the movement of print roll holder 331b to encoder 316, which can convert the instructions into control signals to control roll motor 335, such that roll motor 335 causes drive mechanism 336 to turn print roll holder 331b to rotate at the desired speed and in the desired direction.

Controller 310 can send instructions for curing the ink to LED curing control 324, which can convert the instructions into control signals that cause LED assembly 322 to output radiation, such as visible, ultra-violet (UV), or infrared light, at a power level tuned to cure the ink that is applied by print heads 304. Controller 310 can send instructions for controlling pinning to pinning control 328, which can convert the instructions into control signals that cause pinning stations 326 to provide sufficient power to control or stop the spread of the ink drops 306 after they land on label stock 112.

Controller 310 can read a file received via input signal 312 that contains raster data and cut line data, and can convert the raster data to instructions for ink system 308, which can convert the instructions into control signals that cause print heads 304 to eject ink drops 306 onto the surface of face stock 104 of label stock 112. Print heads 304 can get ink 360 from ink holder 302. Laser 340 is mounted on a laser mechanical assembly that can move laser 340 across label stock 112, in a direction that is perpendicular to the directions of travel of label stock 112. Controller 310 can convert the cut line data to instructions for cutting system 342, which can convert the instructions to control signals that can control the power and movement speed in a first direction of laser 340. The first direction is the direction that is generally or substantially perpendicular to the direction of travel of label stock 112, and a laser mechanical assembly, which holds laser 340, can move laser 340 back and forth across label stock 112. In some embodiments, such as when fixed laser mechanicals are used, the print/cut system includes galvo mirrors. Rather than move laser 340 back and forth across label stock 112, the print/cut system, such as via controller 310, cutting system 342, laser 340, etc., can direct laser power along the cut path using the galvo mirrors.

Controller 310 can also control the speed that label stock 112 moves past laser 340 in a second direction that is parallel to the direction of travel of label stock 112, thereby controlling the laser cut speed in the second direction. Controller 310 can convert the cut line data to instructions for encoder 316, which can convert the instructions into control signals that control the rotation of label stock holder 331b to cause label stock 112 to move at the desired speed and in the desired forward or backward direction, thereby controlling the laser cut speed in the second direction. Controller 310 can also send instructions to matrix system 344, which can convert the instructions to control signals that cause matrix remover 346 to remove the matrix. After the matrix is removed, only labels 204 remain removably bonded to liner 102.

Figure 4:
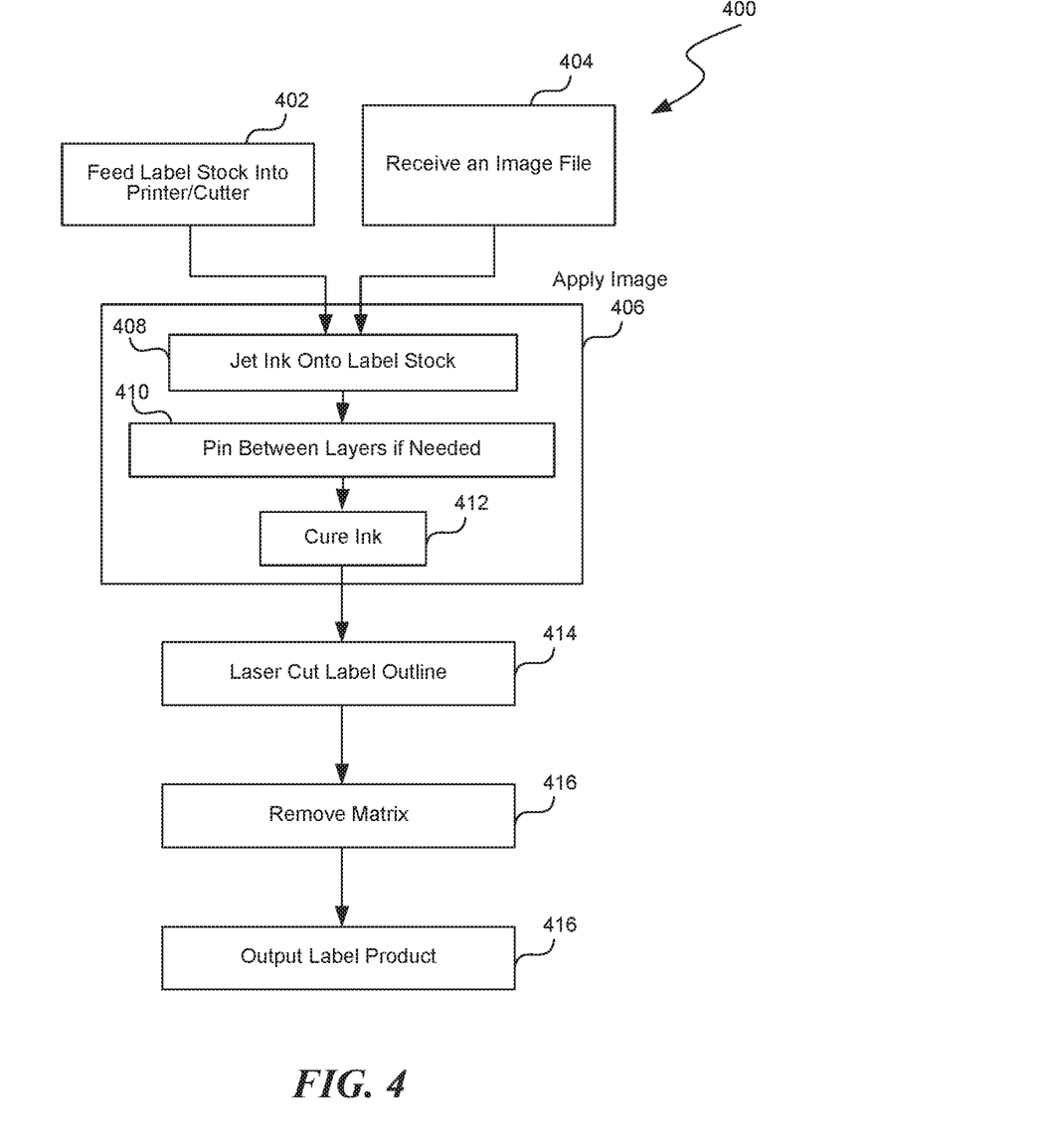
FIG. 4 is a flow diagram illustrating a process for printing and cutting labels, consistent with various embodiments.
Figure 5:
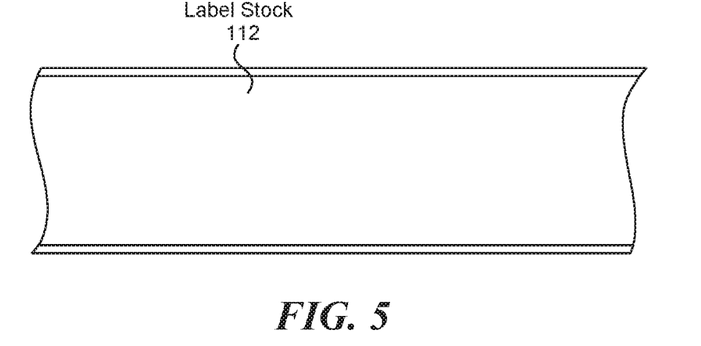
FIG. 5 is an illustration of label stock prior to an image being printed on the label stock, consistent with various embodiments.
Figure 6:
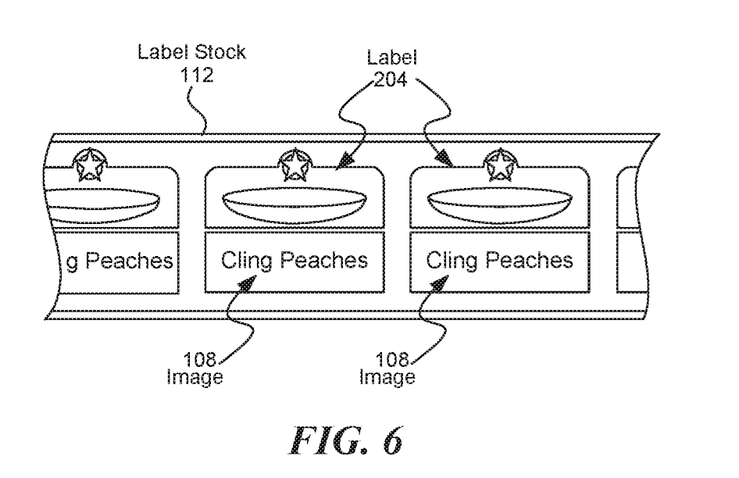
FIG. 6 is an illustration of label stock after an image is printed on the label stock, consistent with various embodiments.

FIG. 4 is a flow diagram illustrating a process for printing and cutting labels, consistent with various embodiments. The process embodied in FIG. 4 will be described using print/cut system 300 of FIG. 3, which both prints and cuts the labels. In some embodiments, the printing of the labels is done by a printing system, while the cutting of the labels is done by a separate cutting system. An operator loads label stock, such as label stock 112 of FIG. 5, onto label stock holder 331a. The operator rotates label stock holder 331a to let some of the label stock out, and starts winding the label stock around label stock holder 331b. Label stock holders 331a and 331b feed label stock 112 into/through print/cut system 300 (step 402) for printing and cutting labels. Controller 310 of print/cut system 300 receives an image file (step 404), which includes raster data and cut line data, via input signal 312. The raster data defines a print pattern for a label image, such as image 108 of FIG. 6, and the cut line data defines a cut pattern for the product label, such as cut line 702 of FIG. 7. The instructions that define the print pattern can control the amounts and types of inks that are jetted by print heads 304 at the various pixel locations of the product label.

Print/cut system 300 applies image 108 to the surface of label stock 112 (step 406). Controller 310, based on the raster data of the image file, sends control signals to the various components of print/cut system 300 to cause image 108 to be printed. For example, controller 310, based on the raster data of the image file, sends instructions to ink system 308, which converts the instructions into control signals that are sent to print heads 304. Print heads 304 jet out ink drops 306 onto label stock 112 to print image 108 onto the surface of face stock 104 of label stock 112. Controller 310, also based on the raster data, causes print heads 304 to be accurately positioned for each pixel that is printed. Print heads 304 are mounted on a print head assembly, which can, based on instructions from controller 310, move the print heads back and forth across label stock 112 to control the location in the first direction. Label stock holders 331a and 331b can move label stock 112 back and forth in the second direction, or in the second direction from 331a to 331b, under print heads 304. By controlling the location of print heads 304 in the first direction, and label stock 112 in the second direction, controller 310 can cause each pixel to be printed at an accurate location. In some embodiments, the print heads are in a fixed position, and the label or print media is transported past the print heads in a single-pass (non-indexing) mode.

To stabilize the ink after printing, controller 310 sends instructions to pinning control 328 to cause pinning stations 326 to pin, if needed, after each layer of ink that is applied (step 410). Pinning stations 326 can pin the ink by applying sufficient power to control or stop the spread of ink drops 306 after landing on label stock 112. Print/cut system 300, in the embodiment of FIG. 3, has three ink colors, and each of the three print heads 304 prints a different one of the three ink colors. After all of the ink colors are applied to label stock 112 by print heads 304, LED assembly 322 applies sufficient power to cure the ink (step 412). By changing the ink being used by print/cut system 300, more than three total colors of ink can be used. For example, when printing a first label, a first set of three colors of ink can be applied. Before printing a second label, the ink can be changed to a second set of three different colors. When printing a second label, the second set of three different colors can be applied.

Print/cut system 300 laser cuts the outline of the labels by cutting where indicated by the cut line data (step 414), such as by cutting cut line 702 of FIG. 7. Controller 310, based on the cut line data of the image file, sends instructions to the various components of print/cut system 300 to cause the outline of image 108 to be cut. In one example, controller 310 sends instructions to cutting system 342 that causes cutting system 342 to control the power, the speed of laser point motion, and/or the frequency of laser 340. Laser 340 is mounted on a laser assembly that moves laser 340 back and forth in the first direction. Controller 310, by controlling the power, the laser point motion speed, and/or the frequency of laser 340, and by controlling the cut location and speed by moving laser 340 back and forth in the first direction and by moving label stock 112 back and forth in the second direction, can cause laser 340 to cut face stock 104 and adhesive 106, without cutting through liner 102. Because adhesive 106 has been cut, when face stock 104 is peeled from liner 102, the adhesive can remain substantially adhered to face stock 104, such that face stock 104 can be adhered to a surface, such as to the surface of a product or good, by use of the adhesive that remains adhered to face stock 104.

In some embodiments, laser 340 cuts through face stock 104, but not though adhesive 106. In these embodiments, when face stock 104 is peeled from liner 102, the adhesive can remain substantially adhered to liner 102. In some embodiments, laser 340 cuts though face stock 104 and adhesive 106, and partially through liner 102. The laser cut into liner 102 can be shallow enough that liner 102 retains sufficient structural integrity that it can be reliably used by a labeling machine. In these embodiments, the adhesive can remain substantially adhered to face stock 104. In some embodiments, liner 102 is made of a material to which the adhesive does not stick permanently, but which easily releases the adhesive and the label to which the adhesive is applied. The same adhesive can be formulated to adhere permanently to the good or object to which the adhesive and associated label are being applied.

Print/cut system 300 removes the matrix from label stock 112 (step 416). For example, controller 310 sends instructions to matrix system 344, which sends control signals to matrix remover 346 that causes matrix remover 346 to remove the matrix. Print/cut system 300 continues printing labels until the end of the roll of label stock 112 is reached, and print/cut system 300 outputs the label product (step 416), which is the roll of label stock 112 with the labels printed and cut, and with the matrix removed. In some embodiments, the matrix is not removed. The label product can be delivered to a product manufacturer, where a labeling machine applies the labels to the manufacturer's products.

Figure 8:
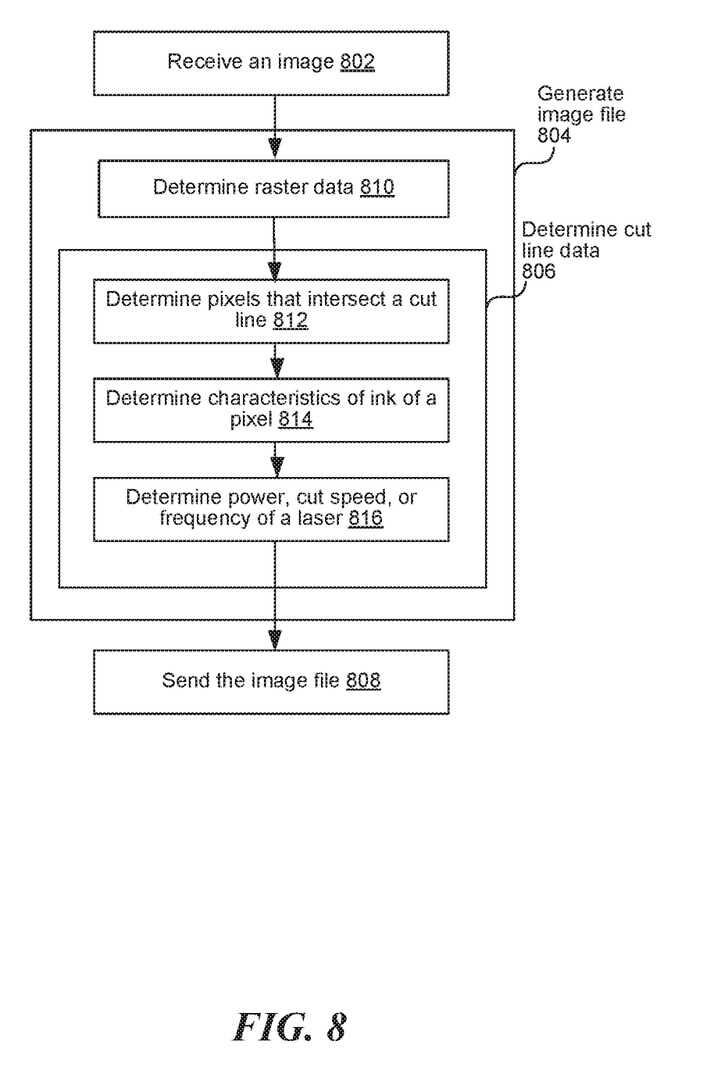
FIG. 8 is a flow diagram illustrating a process for generating an image file that includes raster data and cut line data, consistent with various embodiments.

FIG. 8 is a flow diagram illustrating a process for generating an image file that includes raster data and cut line data, consistent with various embodiments. In the process embodied in FIG. 8, a computer system, such as processing device 900 of FIG. 9, receives an image (step 802), such as an image of label 204. The image may not be in a format that is directly compatible with the label printer. For example, the image may have a resolution of 1000 pixels per inch, while a label printer may print with a resolution of 300 pixels per inch. As a second example, the image may be described in vector graphics format while the printer may require a raster image. The computer system generates an image file based on the image (step 804). The computer system determines the raster data (step 810) by performing a process referred to as rasterization to covert the image data into a format that is compatible with the label printer, such as 300 pixels per inch data for a 300 pixels per inch label printer. The computer system also determines, for each pixel, how much of each type of printer ink to apply at that pixel location to create a printed pixel of the desired color. The computer system can write the raster data, which can include information related to how much of each type of printer ink to apply at each pixel location, to the image file.

The computer system determines the cut line data (step 806). As stated above, a cut line is a line that defines a path to be followed by a laser while cutting face stock of label stock that has labels printed on it. Cut line data is data/instructions that can be read by a laser cutter, and that the laser cutter interprets and/or executes to control the laser to cut a cut line that matches the cut line data. The computer system analyzes the raster data generated during step 810 to determine which pixels intersect the cut line (step 812). For each pixel or group of pixels that intersects the cut line, the computer system determines the characteristics of the ink that will be deposited on the label stock to form that pixel or group of pixels (step 814). The characteristics of the ink can be the amount/quantity of the ink that is deposited/printed on the label stock, the color of the ink, the type of the ink, the number of different inks, the reflectivity of the ink, the thickness of the ink, etc.

Based on the characteristics of the ink of the pixel or group of pixels, which change along the cut line, and further based on the materials of the label stock, which are usually consistent along the cut line, the computer system determines a power, cut speed, and/or a frequency of a laser (step 816) that is tuned to cause the laser to accurately cut through the ink (when present), the face stock, and the adhesive, but to not cut through or cause excessive damage to the liner. For example, when the computer system determines that a first area containing a pixel or group of pixels has less ink, lower reflectivity ink, thinner ink, a lighter colored ink, etc., than a second area containing a pixel or group of pixels, the computer system can increase the power of the laser, decreased the cut speed of the laser, and/or increase the frequency of the laser when transitioning between the first area and the second area in order to deliver more power that is tuned to accurately cut through the ink, the face stock, and the adhesive of the second area. The computer system can add data to the image file to control power, cut speed, frequency, etc. of the laser when cutting the cut line, and can send the image file to a label printing and cutting system.

Figure 9:
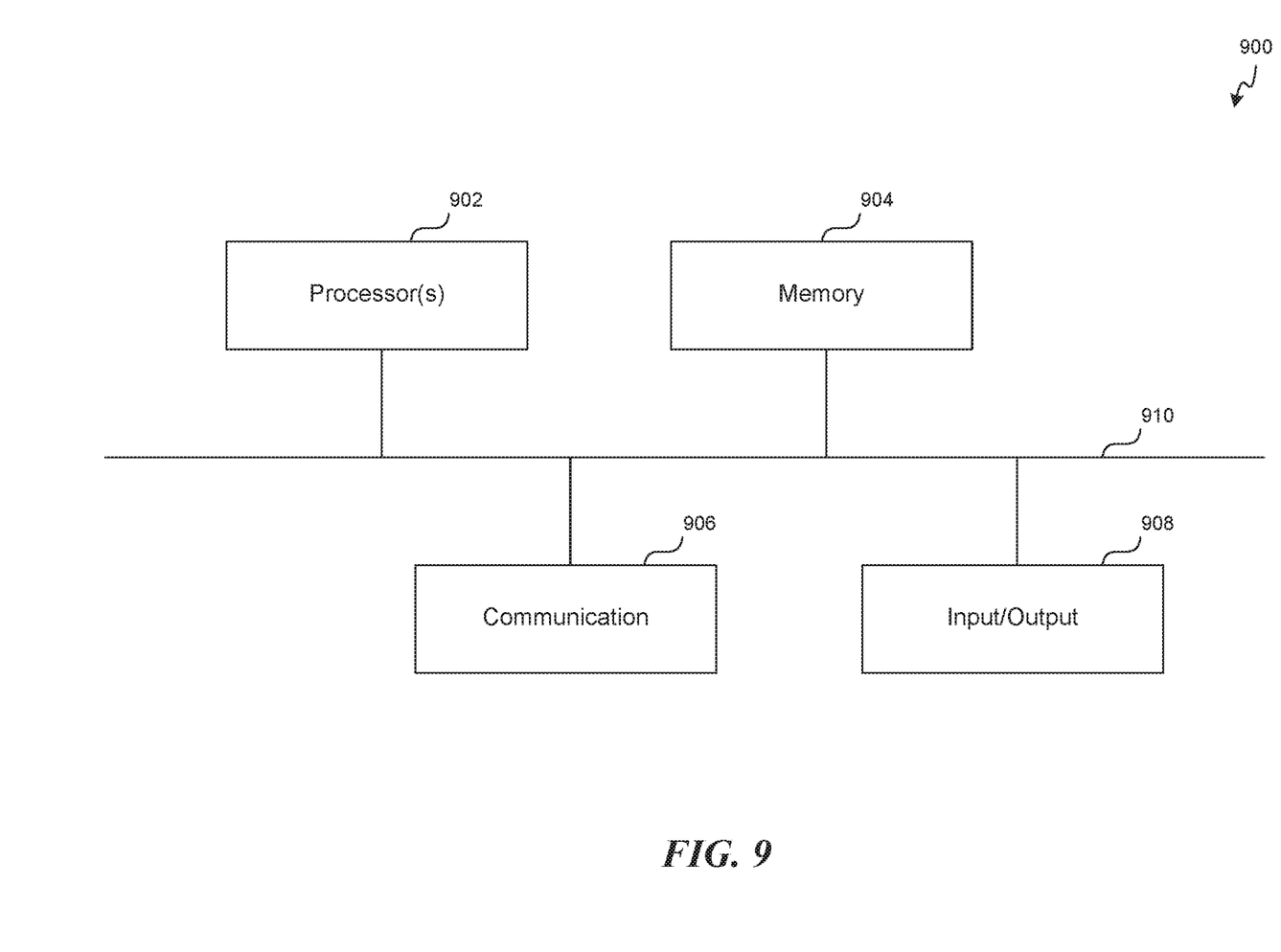
FIG. 9 is a high-level block diagram showing an example of processing system in which at least some operations related to the disclosed technique can be implemented.

FIG. 9 is a high-level block diagram showing an example of a processing device 900 that can represent any of the devices described above, such as the computer system or controller 310. Any of these systems may include two or more processing devices such as represented in FIG. 9, which may be coupled to each other via a network or multiple networks. A network can be referred to as a communication network.

In the illustrated embodiment, the processing system 900 includes one or more processors 902, memory 904, a communication device 906, and one or more input/output (I/O) devices 908, all coupled to each other through an interconnect 910. The interconnect 910 may be or include one or more conductive traces, buses, point-to-point connections, controllers, adapters and/or other conventional connection devices. Each processor 902 may be or include, for example, one or more general-purpose programmable microprocessors or microprocessor cores, microcontrollers, application specific integrated circuits (ASICs), programmable gate arrays, or the like, or a combination of such devices. The processor(s) 902 control the overall operation of the processing device 900. Memory 904 may be or include one or more physical storage devices, which may be in the form of random access memory (RAM), read-only memory (ROM) (which may be erasable and programmable), flash memory, miniature hard disk drive, or other suitable type of storage device, or a combination of such devices. Memory 904 may store data and instructions that configure the processor(s) 902 to execute operations in accordance with the techniques described above. The communication device 906 may be or include, for example, an Ethernet adapter, cable modem, Wi-Fi adapter, cellular transceiver, Bluetooth transceiver, or the like, or a combination thereof. Depending on the specific nature and purpose of the processing device 900, the I/O devices 908 can include devices such as a display (which may be a touch screen display), audio speaker, keyboard, mouse or other pointing device, microphone, camera, etc.

Unless contrary to physical possibility, it is envisioned that (i) the methods/steps described above may be performed in any sequence and/or in any combination, and that (ii) the components of respective embodiments may be combined in any manner.

The techniques introduced above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Note that any and all of the embodiments described above can be combined with each other, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

The invention claimed is:

1. A method for compensated laser cutting of a product label comprising:

receiving, by a label printing system, an image file for the product label;

determining raster data for the product label, wherein the raster data defines a print pattern of a label image for the product label, the raster data including amounts and types of inks to be deposited at various pixel locations on a first surface of a pressure sensitive label stock, wherein the pressure sensitive label stock includes a face stock, an adhesive, and a liner, wherein the face stock is removably bonded by the adhesive to the liner, and wherein the first surface is on the face stock;

determining cut line data for the product label, wherein the cut line data defines a cut pattern for the product label;

analyzing the raster data to determine which pixels intersect the cut line;

determining characteristics of the inks for each of the pixels that intersect the cut line;

calculating reflectivity of the inks and the face stock at each of the pixels that intersect the cut line;

determining a variable setting for speed of moving the product label in a first direction, speed of moving a laser of a label cutting system in a second direction perpendicular to the first direction, and any of power or frequency of a laser of a label cutting system, based on the face stock, the adhesive, the determined characteristics of the inks for each of the pixels that intersect the cut line, and the calculated reflectivity of the inks and the face stock at each of the pixels that intersect the cut line;

based on the image file, printing the product label, by the label printing system, on the first surface of pressure sensitive label stock; and controllably varying 1) speed of moving the product label in a first direction, 2) speed of moving a laser of a label cutting system in a second direction perpendicular to the first direction, and 3) any of the power or the frequency of the laser for each of the pixels that intersect the cut line, by the label cutting system, based on the determined variable setting, to cut through the inks for each of the pixels that intersect the cut line, the face stock, and the adhesive, without cutting through the liner.

2. A method comprising:

receiving, by a computer system, an image file for a label;

determining raster data for the label, wherein the raster data defines a print pattern of an image for the label, the raster data including amounts and types of inks to be deposited at different pixel locations on a first surface of a pressure sensitive label stock, wherein the pressure sensitive label stock includes a face stock, an adhesive, and a liner, wherein the face stock is removably bonded by the adhesive to the liner, and wherein the first surface is on the face stock;

determining cut line data for the label, wherein the cut line data defines a cut pattern for the label;

analyzing the raster data to determine which of the pixel locations intersect the cut line;

determining characteristics of the face stock and the inks for each of the pixel locations that intersect the cut line, including a calculated reflectivity of the inks and the face stock at each of the pixels that intersect the cut line;

based on the raster data, printing the label on the first surface of the pressure sensitive label stock; and with a laser, cutting along the cut pattern, wherein 1) speed of moving the product label in a first direction, 2) speed of moving a laser of a label cutting system in a second direction perpendicular to the first direction, and 3) any of power or frequency of the laser are variably controlled for each of the pixel locations that intersect the cut line, to cut through the inks at each of the pixel locations that intersect the cut line, through the face stock, and through the adhesive, without cutting through the liner, wherein each of the plurality of settings of the laser is set based on the calculated reflectivity of the inks and the face stock at each of the pixels that intersect the cut line.

3. The method of claim 2, wherein the inks are printed by a four color process printer.

4. The method of claim 3, wherein the print pattern defines an amount of each of cyan ink, magenta ink, yellow ink and black ink to be deposited at each of the pixel locations on the label.

5. The method of claim 2, wherein each of the plurality of settings is set to facilitate cutting through the adhesive, that removably bonds the face stock to the liner, at the corresponding cut pattern location.

6. The method of claim 2, wherein the power is higher or the frequency is higher at a first cut pattern location than at a second cut pattern location when the amount of ink at the first cut pattern location is more than at the second cut pattern location.

7. The method of claim 2, wherein the face stock is made of biaxially oriented polypropylene.

8. The method of claim 2, wherein the plurality of settings is based on a material of the face stock.

9. The method of claim 8, wherein the power is higher or the frequency is higher at a first cut pattern location when the material is paper than when the material is biaxially oriented polypropylene.

10. A system comprising:
a processor;
a communication interface, coupled to the processor, through which to communicate over a network with remote devices; and
a memory coupled to the processor, the memory storing instructions which when executed by the processor cause the system to perform operations including:
generating an image file that includes first data that defines a cut pattern corresponding to a cut line for a label, and that includes second data that defines a plurality of settings for a laser coupled to a second computer system, the settings including a speed of moving the laser in a direction perpendicular to a direction of moving the label and a power or a frequency of the laser,
wherein each of the plurality of settings is associated with a corresponding pixel location along the cut line on label stock that includes a face stock;
setting the speed of moving the laser in the direction perpendicular to the direction of moving the label and any of the power or the frequency of the laser, based on data that defines an amount of ink to be printed at each of the pixel locations along the cut line, and a calculated reflectivity of the inks and the face stock at each of the pixel locations along the cut line, to enable the laser to cut through the printed ink and the face stock of the label stock along the cut line, without cutting through material to which the face stock is removably bonded; and
sending, via the communication interface, the image file to the second computer system to enable the second computer system to control the speed of moving the laser in the direction perpendicular to the direction of moving the label and the power or the frequency of the laser to cut through the printed ink and the face stock, without cutting through the material.

11. The system of claim 10, wherein the operations further include:
generating a raster file that includes data that defines an amount and a type of ink to be deposited at each of a plurality of locations on the label, and wherein each of the plurality of settings is based on the amount and the type of ink to be deposited at the corresponding cut pattern location.

12. The system of claim 11, wherein the image file and the raster file are a single same file.

13. A system comprising:
a processor;
a communication interface, coupled to the processor, through which to communicate over a network with remote devices; and
a memory coupled to the processor, the memory storing instructions which when executed by the processor cause the system to perform the operations of claim 1.

* * * * *